Oct. 23, 1956
C. E. HENDRIX ET AL
2,768,298
LOW FREQUENCY RANDOM NOISE SOURCE
Filed Oct. 28, 1954
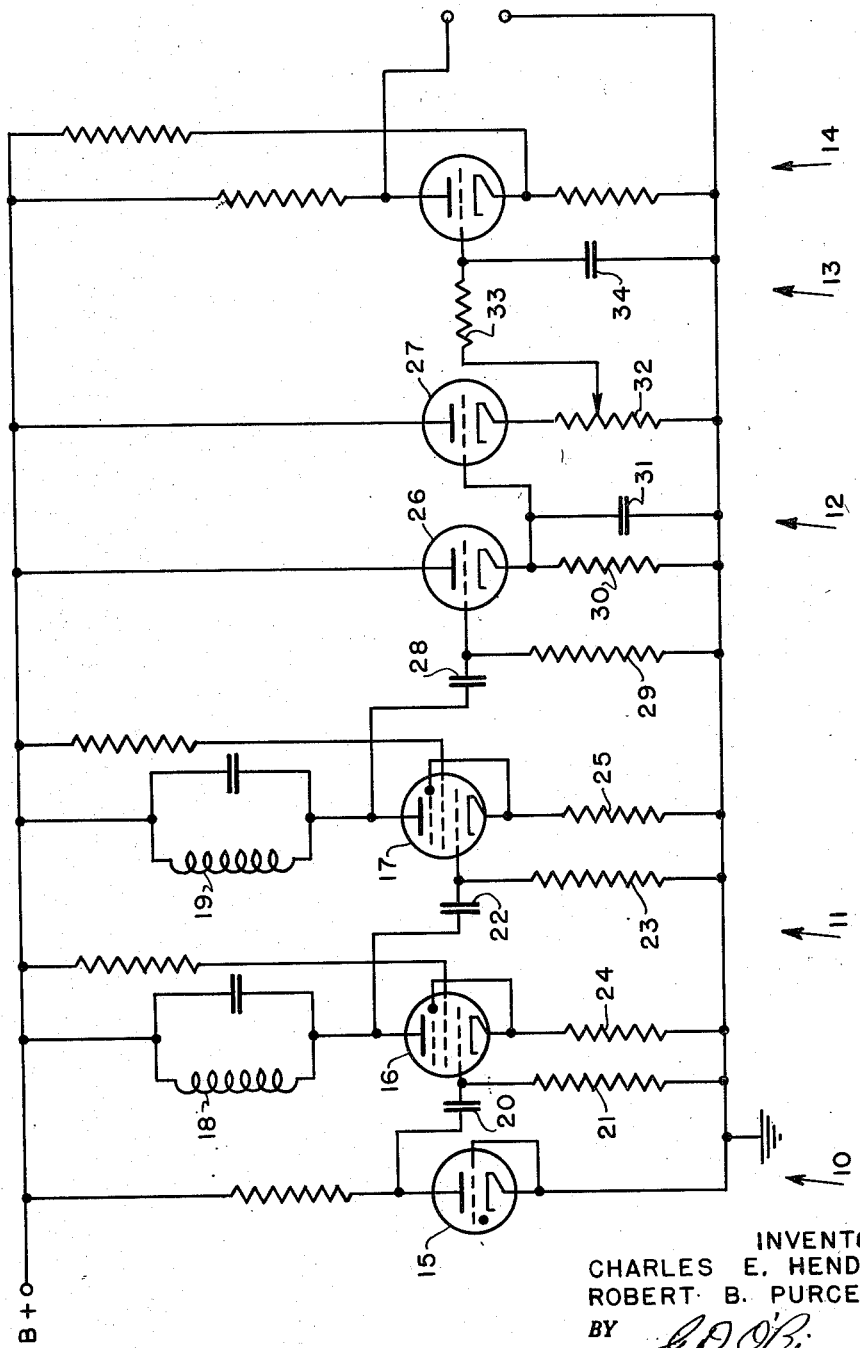
INVENTORS
CHARLES E. HENDRIX
ROBERT B. PURCELL
BY
ATTORNEYS.

United States Patent Office 2,768,298
Patented Oct. 23, 1956

2,768,298

LOW FREQUENCY RANDOM NOISE SOURCE

Charles E. Hendrix and Robert B. Purcell, China Lake, Calif., assignors to the United States of America as represented by the Secretary of the Navy Application October 28, 1954, Serial No. 465,453

4 Claims. (Cl. 250—36)

(Granted under Title 35, U. S. Code (1952), sec. 266)

The invention described herein may be manufactured and used by or for the Government of the United States of America for governmental purposes without the payment of any royalties thereon or therefor.

The present invention relates to electronic noise generators and more particularly to a low frequency random noise signal generator.

Certain electronic simulators incorporate as one of their components a random noise generator for producing an electrical signal which varies in a random or unpredictable manner. One such simulator is a radar target simulator which is operative to provide an output signal simulating the target signal encountered in actual radar target tracking operations. Such a radar target simulator may be employed, for example, in conjunction with newly developed radar systems for making laboratory assessments of the operating characteristics of such systems. To insure accurate laboratory assessments, that is, to insure that the operating characteristics exhibited in a laboratory by a particular radar system will resemble as closely as possible the characteristics which the same system would exhibit under actual target tracking operations, it is necessary that input to the system accurately simulate the target signal encountered in the field.

It has been found that in actual tracking operations, the radar beam of high frequency energy is not consistently reflected from a particular portion of the target, such as an airplane, but rather the beam will be reflected first from one portion of the target, such as the nose portion of an airplane, and then from another portion of the target, such as the tail portion of the plane. This tendency of the beam to be continuously reflected from different parts of the target results in the introduction into the radar system of a low frequency random noise signal, commonly referred to as target glint noise, which must be duplicated in the output of the radar target simulator if such output is to accurately simulate an actual target signal whereby to enable the operating characteristics of a radar system to be accurately determined in a laboratory. The present invention, then, relates to a device for producing a low frequency voltage which varies in a random or unpredictable manner which voltage may be used to simulate such target glint noise in a radar target simulator. Another use of the invention is that of introducing noise into analog computers for simulation purposes.

Various prior arrangements have been proposed for performing the function of the instant invention. One such prior arrangement combined a thyratron noise source with a narrow band amplifier, local oscillator, mixer, and a low-pass filter in such a manner that the high frequency thyratron noise was amplified, the resulting signal heterodyned with the local oscillator frequency, and the resultant sum and difference frequencies, containing the low frequency components, isolated by the filter. The prime disadvantage of this, and others of the prior random noise generating arrangements, was that output thereof was small with the result that several stages of D. C. amplification were required after filtering.

The present invention, which avoids the necessity of utilizing several stages of direct coupled amplifiers, comprises generally a thyratron noise source, narrow band amplifier, detector and low pass filter. Operation of the invention is based on the principle that the amount of energy in the thyratron noise which lies in the pass band of the narrow band amplifier varies in a random fashion, the output of the amplifier being, in effect, a carrier frequency modulated in a random manner by a relatively low frequency noise. The modulation envelope, which can be relatively large in amplitude, is detected whereby to recover the low frequency random noise signal. When the band width involved is relatively narrow, considerable power at very low frequencies may be achieved without the necessity of passing the low frequency signal through several amplifier stages.

Other objects and numerous advantages of the invention will become apparent as the same becomes better understood from the following detailed description had in conjunction with the annexed drawing wherein the single figure schematically illustrates the present random noise generator.

Referring now to the single figure of the drawing, the numeral 10 denotes generally the random noise source, 11 the narrow band amplifier, 12 the detector, 13 the low pass filter, and 14 any desired output circuit such as the output amplifier shown if such be found necessary to provide the desired random signal strength. Random noise source 10 comprises a thyratron tube 15 having its grid at cathode potential as by means of the direct connection between grid and cathode shown. A load resistor is provided in the plate circuit of thyratron 15 as illustrated. Tuned amplifier 11 comprises a pair of tuned plate amplifiers 16 and 17 having parallel resonant circuits 18 and 19 in their respective plate circuits. The output of thyratron 15, which is a relatively wide band signal containing a random noise component, is coupled to the grid of the first amplifier tube 16 through a coupling condenser 20 and a grid leak resistor 21. The output of the first amplifier tube 16 is coupled to the grid of the second amplifier tube 17 through a coupling condenser 22 and grid leak resistor 23, bias for tubes 16 and 17 being supplied by cathode bias resistors 24 and 25 respectively. The characteristics of the tank circuits 18 and 19 are such that only a relatively narrow band of the frequencies contained in the output from thyratron 15 will be amplified whereby to provide an output from the tuned amplifier 11 which is, in effect, an amplified carrier signal modulated by the random noise component. The tuned amplifier output is fed to the grid of a first triode 26 of the pair of triodes 26 and 27, comprising the detector 12, through the coupling condenser 28, the grid of tube 26 being grounded through a grid leak resistor 29. The cathode of triode 26 is grounded through a cathode bias resistor 30, the cathode end of which is directly connected to the grid of triode 27. Cathode resistor 30 is shunted by a condenser 31, the values of condenser 31 and cathode resistor 30 being such as to provide a relatively long discharge time constant for condenser 31. During positive going swings of the signal fed to the grid of triode 26 from the tuned amplifier 11, the circuit comprising tube 26 and cathode resistor 30 forms essentially a cathode follower wherein the output voltage coupled to the grid of tube 27 is taken across the cathode resistor 30. During the negative going swings of the potential impressed on the grid of tube 26, condenser 31 discharges through cathode resistor 30 whereby to provide an input to triode 27 which conforms approximately to the envelope of the tuned amplifier output, that is, the random noise component of the thyratron output. Triode 27 and its cathode resistor 32 form a cathode follower in which the output is taken across a selected portion of cathode resistor 32 as by means of the adjustable pickoff shown. The cathode follower comprising triode 27 and resistor 32 functions as an impedance matching network between the circuit including shunt capacitor 31 and the low pass filter circuit 13 comprising a resistance 33 and a shunt capacitor 34, which filter circuit serves to eliminate undesirable ripple in the low frequency random noise output signal from detector 12. The output from filter 13, which will be the approximate envelope of the thyratron output, and will comprise a low frequency voltage signal whose magnitude varies in a random manner, may be coupled to any suitable output circuit such as an amplifier 14. It has been found that if the pass band of the tuned amplifier stage is made relatively narrow, say on the order of 10 cycles, the low frequency random voltage output of the system will be relatively strong whereby to eliminate the necessity of several D. C. amplification stages after filter 13.

From the above it will be seen that the present invention, comprising essentially a random noise source, means for amplifying a narrow band of the frequencies contained in the output of the source, and means for recovering the approximate envelope of such band, provides a relatively simple and inexpensive arrangement for generating a low frequency random voltage signal, which signal, if the pass band of the tuned amplifier stage is relatively narrow, will be sufficiently strong for its intended use without the necessity of heterodyning or passing the random signal through several amplification stages.

It will be apparent that many modifications are possible in the light of the above teachings and, therefore, that the invention may be practiced otherwise than as specifically described herein.

What is claimed is:

1. A random noise signal generator, comprising means for generating an alternating current voltage signal whose magnitude varies in a random manner, means for amplifying a relatively narrow band of the frequencies contained in said signal, a detector circuit including a cathode follower coupled to the output of said amplifying means for producing an output voltage which varies approximately in accordance with the envelope of the output of said amplifying means, and a condenser shunting the cathode resistor of said follower, the values of said resistor and condenser being such as to provide a relatively long time constant for the discharge of said condenser relative to the frequency of the output of said amplifying means.

2. A random noise signal generator, comprising a circuit including a gas discharge tube for generating a wide band alternating current voltage signal whose magnitude varies in a random manner, means for amplifying a narrow band of the frequencies contained in said signal, and a detector circuit including a cathode follower coupled to the output of said amplifying means for producing an output voltage which varies approximately in accordance with the envelope of the output of said amplifying means, a condenser shunting the cathode resistor of said follower, the values of said resistor and condenser being such as to provide a relatively long time constant for the discharge of said condenser relative to the frequency of the output of said amplifying means, and a low pass filter coupled to the output of said detector circuit.

3. A random noise signal generator, comprising a circuit including a thyratron for generating an alternating current voltage signal whose magnitude varies in a random manner, a tuned amplifier coupled to the output of said circuit for amplifying a narrow band of the frequencies contained in said signal, a detector circuit including a cathode follower coupled to the output of said amplifier for producing an output voltage which varies approximately in accordance with the envelope of the amplifier output, and a condenser shunting the cathode resistor of said follower, the values of said resistor and condenser being such as to provide a relatively long time constant for the discharge of said condenser relative to the frequency of the amplifier output.

4. A random noise signal generator, comprising a circuit including a thyratron for generating an alternating current voltage signal whose magnitude varies in a random manner, a tuned amplifier coupled to the output of said circuit for amplifying a narrow band of the frequencies contained in said signal, a detector circuit including a cathode follower for producing an output voltage which varies approximately in accordance with the envelope of the amplifier output, a condenser shunting the cathode resistor of said cathode follower, the values of said resistor and condenser being such as to provide a relatively long time constant for the discharge of said condenser relative to the frequency of the amplifier circuit, and a low pass filter coupled to the output of said detector circuit.

References Cited in the file of this patent

UNITED STATES PATENTS

| | | |
|---|---|---|
| 2,607,896 | Chambers | Aug. 19, 1952 |
| 2,639,386 | Karpless | May 19, 1953 |